(12) United States Patent
Tsuzuki et al.

(10) Patent No.: US 10,474,128 B2
(45) Date of Patent: Nov. 12, 2019

(54) ABNORMALITY ANALYSIS SYSTEM AND ANALYSIS APPARATUS

(71) Applicant: JTEKT CORPORATION, Osaka-shi (JP)

(72) Inventors: Toshiyuki Tsuzuki, Anjo (JP); Katsushi Kitamura, Nagoya (JP); Koji Kito, Toyota (JP); Sakon Murayama, Kariya (JP); Yuki Ishigure, Gifu (JP)

(73) Assignee: JTEKT CORPORATION, Osaka-shi (JP)

( * ) Notice: Subject to any disclaimer, the term of this patent is extended or adjusted under 35 U.S.C. 154(b) by 263 days.

(21) Appl. No.: 15/349,309

(22) Filed: Nov. 11, 2016

(65) Prior Publication Data

US 2017/0139398 A1     May 18, 2017

(30) Foreign Application Priority Data

Nov. 16, 2015   (JP) .................................. 2015-224113
Aug. 10, 2016   (JP) .................................. 2016-157612

(51) Int. Cl.
   *G05B 19/406*    (2006.01)
   *G05B 23/02*     (2006.01)
   *G05B 19/418*    (2006.01)

(52) U.S. Cl.
   CPC ..... *G05B 19/406* (2013.01); *G05B 19/41875* (2013.01); *G05B 23/0235* (2013.01); *G05B 23/0262* (2013.01); *G05B 2219/24033* (2013.01); *G05B 2219/32222* (2013.01)

(58) Field of Classification Search
   CPC ......... Y04S 10/54; H04L 67/10; H04L 43/08; G06N 5/04; G06N 20/00; G06Q 10/0639; G05B 19/41875; G05B 23/0283
   USPC ........................................................ 705/7.38
   See application file for complete search history.

(56) References Cited

U.S. PATENT DOCUMENTS

| | | | |
|---|---|---|---|
| 2011/0026407 A1* | 2/2011 | Yamada | G05B 23/0264 370/242 |
| 2014/0033830 A1* | 2/2014 | Kasuga | B24B 49/16 73/862.49 |
| 2014/0114976 A1* | 4/2014 | Shiraishi | G06F 16/583 707/737 |
| 2016/0110722 A1* | 4/2016 | Reddy | G06Q 30/012 705/302 |

(Continued)

FOREIGN PATENT DOCUMENTS

| | | |
|---|---|---|
| JP | 2013-129027 | 7/2013 |
| JP | 2014-154094 | 8/2014 |
| WO | WO 2012/098805 A1 | 7/2012 |

*Primary Examiner* — Jonathan Han
(74) *Attorney, Agent, or Firm* — Oblon, McClelland, Maier & Neustadt, L.L.P.

(57) ABSTRACT

A plurality of production facilities and an analysis apparatus are connected through a fog network. The analysis apparatus performs a data analysis based on detection information of detectors acquired through the fog network and stores determination information relating to an abnormality of each of the plurality of production facilities or an abnormality of a production object as a result of the data analysis. Each of the plurality of production facilities determines an abnormality of the each of the plurality of production facilities or an abnormality of the production object based on the determination information stored in the analysis apparatus.

21 Claims, 8 Drawing Sheets

(56) References Cited

U.S. PATENT DOCUMENTS

2016/0254782 A1* 9/2016 Leary ................. H02S 50/00
                                                                         250/208.2
2017/0032281 A1* 2/2017 Hsu ................... B23K 9/0953

* cited by examiner

ABNORMALITY ANALYSIS SYSTEM AND ANALYSIS APPARATUS

INCORPORATION BY REFERENCE

This application is based on and claims priority under 35 U.S.C. 119 with respect to Japanese Applications Nos. JP2015-224113 filed on Nov. 16, 2015, and JP2016-157612 filed on Aug. 10, 2016, the entire content of which is incorporated herein by reference.

BACKGROUND OF THE INVENTION

Field of the Invention

The present invention relates to an abnormality analysis system and an analysis apparatus used in an abnormality analysis system.

Description of Related Art

In Patent Literature 1, a method for monitoring a grinding burn of a workpiece is described. In the method, during grinding of a workpiece, by detecting a grinding load of a grinding wheel and a rotation speed of the workpiece and comparing the detected grinding load with a threshold of the grinding load according to the rotation speed, the presence/absence of the occurrence of a grinding burn is determined. Here, the threshold is set based on the grinding load of the grinding wheel with respect to the rotation speed of the workpiece at the time of the occurrence of a grinding burn of the workpiece.

In Patent Literature 2, it is described that trial grinding is performed, and a threshold is set based on a grinding load acquired in the trial grinding. Thereafter, by comparing a grinding load detected in actual grinding with the threshold, the presence/absence of the occurrence of a grinding abnormality is determined.

In Patent Literature 3, it is described to predict a quality abnormality of a product based on a quality tendency pattern as below. For example, in a case where the outer peripheral faces of workpiece are grinded using a grinding wheel, as the number of the workpieces increases, the dimension precision tends to deteriorate (see FIG. 4 of Patent Literature 3). In addition, based on a relation between a grinding time and grinding resistance of one workpiece, a relation between the number of workpieces and an average value of the grinding resistance is acquired (see FIGS. 5 and 10 of Patent Literature 3). Then, by considering a relation between the number of workpieces and the dimension precision, in a quality tendency pattern representing a relation between the number of workpieces and an average value of grinding resistance, a threshold for the average value of the grinding resistance can be set. In other words, by acquiring grinding resistance and the number of workpieces, an abnormality of a product can be predicted based on the quality tendency pattern and the threshold.

LIST OF RELATED ART

Patent Literature

[PATENT LITERATURE 1]: JP2013-129027A
[PATENT LITERATURE 2]: WO2012/098805
[PATENT LITERATURE 3]: JP2014-154094A

DISCLOSURE OF INVENTION

Problems to be Solved by the Invention

In recent years, the present era is called an era of Internet of Things (IoT), and the utilization of big data acquired by connecting many things to the Internet is expected. Also in production facilities, based on a large quantity of information acquired from production facilities, analyses of abnormalities of production objects are expected to be performed as well.

In addition, in recent years, cloud computing is known. The cloud computing is in the form of using computers connected through the Internet or the like. For example, instead of using data and applications stored in a computer that is held, data stored in a computer connected through the Internet or the like or an application of the computer is used by using the computer that is held.

The big data of production facilities is considered to be utilized by using cloud computing. However, in the cloud computing, since very huge data is communicated, there are cases where communication congestion occurs. In addition, in a case where a distance up to a cloud server is long, a communication time becomes long. For this reason, in a case where the cloud computing is used, rapidity is insufficient.

In a case where an abnormality analysis of production facilities is performed, by early feeding back a result of the analysis to the production facilities, an effect of suppression of the occurrence of an abnormality of a production object can be expected. For this reason, it is not sufficient to use the cloud computing as an abnormality analysis system of production facilities as it is.

An object of the present invention is to provide an abnormality analysis system capable of performing an analysis based on information of a large quantity of production facilities and early feeding back a result of the analysis to a production facility and an analysis apparatus used therein.

Means to Solve the Problems (1. Abnormality Analysis System)

An abnormality analysis system according to the present invention includes: a plurality of production facilities each being a facility producing a production object and including one or a plurality of detectors; a first network that is connected to the plurality of production facilities and is installed within a predetermined area in which fog computing is built; and an analysis apparatus that is connected to the first network, performs a data analysis based on detection information of the detectors acquired through the first network, and generates determination information relating to an abnormality of each of the plurality of production facilities or an abnormality of the production object based on a result of the data analysis. Each of the plurality of production facilities includes an abnormality determination apparatus that determines an abnormality of the each of the plurality of production facilities or an abnormality of the production object based on the determination information generated by the analysis apparatus.

The detector of each of the plurality of production facilities and the analysis apparatus are connected through the first network that is installed within the predetermined area building the fog computing. The fog computing is a system that is connected to a network of an area narrower than that of the cloud computing. In other words, the first network building the fog computing is a network installed within a predetermined area narrower than the area building the cloud computing. For this reason, in data communication between the detector and the analysis apparatus, an occurrence of communication congestion is suppressed. In addition, since the first network is built within the predetermined area that is narrow, a communication time between the production facility and the analysis apparatus can be shortened. Accordingly, the analysis apparatus can receive the detection information acquired by the detector at a high speed.

The analysis apparatus can acquire the detection information of the plurality of production facilities and perform an analysis and thus, can early feed a result acquired by the analysis apparatus back to the production facilities. Since the analysis result can be early fed back to the production facilities, an occurrence of an abnormality of the production object can be reliably suppressed at a further early time.

(2. Analysis Apparatus)

An analysis apparatus according to the invention is the above-described analysis apparatus used in the abnormality analysis system described above. According to the analysis apparatus, the effects according to the abnormality analysis system described above can be acquired.

BRIEF DESCRIPTION OF THE ATTACHED DRAWINGS

DETAILED DESCRIPTION OF THE PREFERRED EMBODIMENTS OF THE INVENTION

<1. First Embodiment>
(1-1. Configuration of Abnormality Analysis System)

Figure 1:
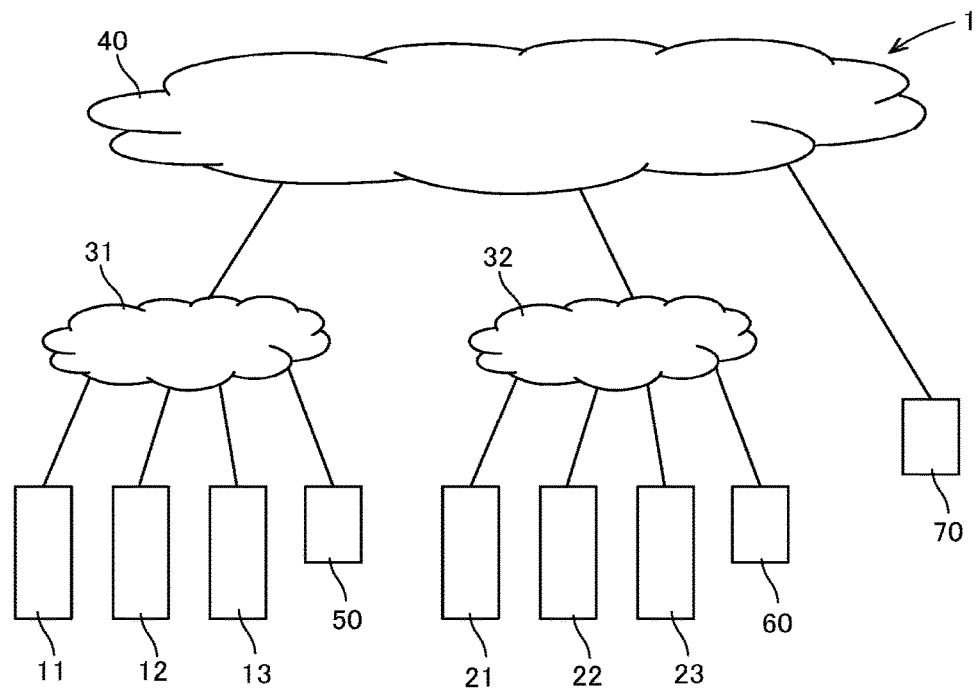
FIG. 1 is a diagram that illustrates an abnormality analysis system.

The configuration of an abnormality analysis system 1 according to this embodiment will be described with reference to FIG. 1. As illustrated in FIG. 1, the abnormality analysis system 1 includes: production facilities 11 to 13; other production facilities 21 to 23; a fog network 31 that is connected to the production facilities 11 to 13; another fog network 32 that is connected to the other production facilities 21 to 23; a cloud network 40 that is connected to the fog networks 31 and 32; an analysis apparatus 50; another analysis apparatus 60; and a higher-rank analysis apparatus 70. Here, the analysis apparatuses 50 and 60 and the higher-rank analysis apparatus 70, for example, may be a built-in system of a programmable logic controller (PLC), a computerized numerical control (CNC) device, or the like or may be a personal computer, a server, or the like.

The production facilities 11 to 13 (corresponding to production facilities according to the present invention) are facilities that produce predetermined production objects. The other production facilities 21 to 23 (corresponding to other production facilities according to the present invention) are facilities that produce predetermined production objects. Here, the production objects produced by the production facilities 11 to 13 and the production objects produced by the other production facilities 21 to 23 may be either of a same kind or of different kinds.

The production facilities 11 and 21, for example, are machine tools that are responsible for a first processing process in a production line and are grinders grinding crankshafts or the like. The production facilities 13 and 23 are machine tools that are responsible for a second processing process and are grinders grinding crankshafts or the like as described above. The production facilities 12 and 22 are conveyers that convey a production object between the production facilities 11 and 13 or between the production facilities 21 and 23.

The production facilities 11 to 13 are installed inside a same building or inside neighboring buildings. The other production facilities 21 to 23 are installed inside a same building or inside neighboring buildings and are installed inside buildings located at places different from those of the production facilities 11 to 13. For example, there are a case where the production facilities 11 to 13 are installed in Japan, and the other production facilities 21 to 23 are installed in a country other than Japan, a case where the production facilities 11 to 13 and the other production facilities 21 to 23 are installed in Japan and are installed at regions located far from each other, and the like.

In other words, the production facilities 11 to 13 are installed inside a predetermined area in which fog computing can be built. In addition, similarly, the other production facilities 21 to 23 are installed inside a predetermined area in which fog computing can be built. However, the production facilities 11 to 13 and the other production facilities 21 to 23 are installed in areas in which fog computing cannot be built.

Here, the fog computing is a system connected to a network of an area narrower than that of the cloud computing. In other words, a network in which the fog computing is built is a network installed inside a predetermined area that is narrower than an area in which the cloud computing is built. The fog computing is also referred to as edge computing.

The fog network 31 (corresponding to a first network according to the invention) is a network that is connected to the production facilities 11 to 13 and is installed inside a predetermined area in which fog computing is built. The fog network 31 is installed inside a same building as a building in which the production facilities 11 to 13 are installed or is installed inside a building neighboring to a building in which any one of the production facilities 11 to 13 is installed.

The other fog network 32 is a network that is connected to the other production facilities 21 to 23 and is installed inside a predetermined area in which fog computing is built. The other fog network 32 is installed inside a same building as a building in which the other production facilities 21 to 23 are installed or is installed inside a building neighboring to a building in which any one of the other production facilities 21 to 23 is installed. The other fog network 32 is not directly connected to the fog network 31. Here, as the fog networks 31 and 32, the internet, a local area network (LAN), a wide area network (WAN), or the like can be applied.

The cloud network 40 (corresponds to a second network according to the invention) is a network that is connected to the fog networks 31 and 32. The cloud network 40 is a wide area network of a wider area than those of the fog networks 31 and 32 and, for example, is the internet. For this reason, the cloud network 40 becomes a network that connects the production facilities 11 to 13 and the other production facilities 21 to 23.

The analysis apparatus 50 is directly connected to the fog network 31 and is installed in a same building as a building in which the production facilities 11 to 13 are installed or in a building neighboring to the building. The analysis apparatus 50 performs a data analysis based on detection information acquired from the production facilities 11 to 13. The analysis apparatus 50, for example, acquires detection information of the production facilities 11 to 13 corresponding to one day and performs the data analysis every day. By repeating the data analysis several times, learning may be performed. Then, the analysis apparatus 50 stores determination information relating to an abnormality of the production facilities 11 to 13 or an abnormality of production objects by the production facilities 11 to 13 as a result of the data analysis. In addition, by acquiring a result of a higher-rank data analysis performed by the higher-rank analysis apparatus 70 to be described later, the analysis apparatus 50, decides determination information based on the result of the data analysis performed by the analysis apparatus 50 and the result of the higher-rank data analysis performed by the higher-rank analysis apparatus 70 and stores the determination information.

The other analysis apparatus 60 is directly connected to the fog network 32 and is installed in a same building as a building in which the production facilities 21 to 23 are installed or inside a building neighboring thereto. The other analysis apparatus 60 performs a data analysis based on the detection information acquired from the other production facilities 21 to 23. The other analysis apparatus 60 performs a process similar to the process performed by the analysis apparatus 50 described above with the other production facilities 21 to 23 set as objects.

The higher-rank analysis apparatus 70 is connected to the cloud network 40 and performs a higher-rank data analysis based on acquired information. In other words, the higher-rank analysis apparatus 70 acquires information from the production facilities 11 to 13 through the cloud network 40 and the fog networks 31 and 32 and acquires information from the other production facilities 21 to 23. The higher-rank analysis apparatus 70 has a higher-rank data analysis requiring a longer time than the data analysis performed by the analysis apparatuses 50 and 60 as its object and has a higher-rank data analysis using a large quantity of information as its object. The higher-rank analysis apparatus 70, for example, acquires detection information of the production facilities 11 to 13 and the other production facilities 21 to 23 that corresponds to one week, several weeks, one month, or several months and performs a data analysis according to the acquisition period. By repeating the higher-rank data analysis several times, learning may be performed.

(1-2. Configuration of Production Facility 11)

Figure 2:
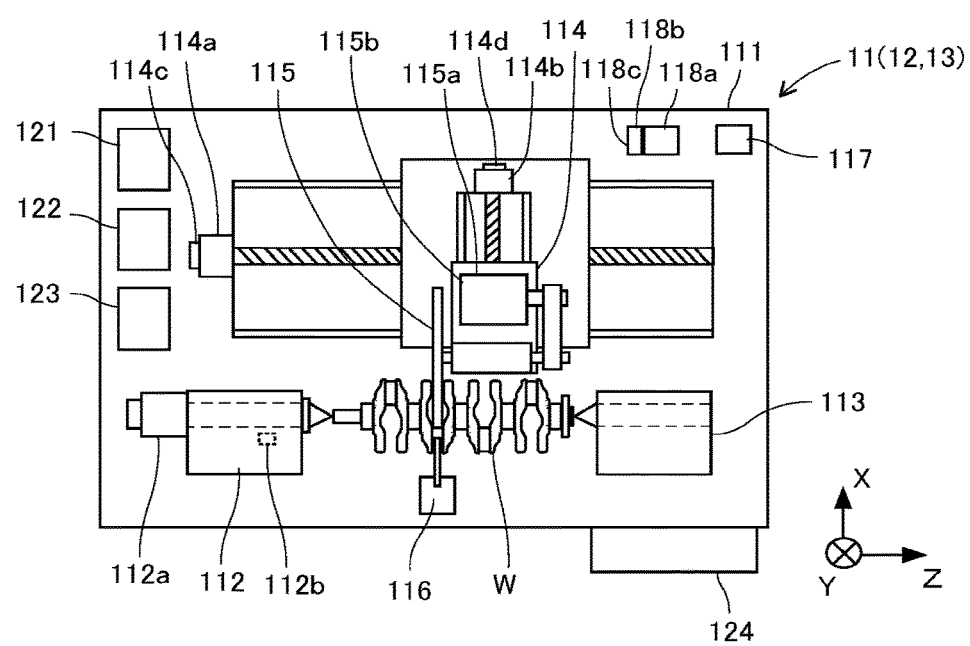
FIG. 2 is a diagram that illustrates the configuration of a grinder as an example of a production facility illustrated in FIG. 1.

Next, an example of the configuration of the production facility 11 will be described with reference to FIGS. 2 to 4. In this embodiment, the production facility 11, for example, is a grinder. As an example of the grinder 11, a grinder of a grinding wheel base traversing type traversing (moving in the Z-axis direction) a grinding wheel base 114 with respect to a bed 111 will be described as an example. However, the grinder 11 can be also applied to a grinder of a table traversing type in which a main spindle device 112 traverses (moving in the Z-axis direction) with respect to a bed 111.

A production object (workpiece) of the grinder 11, for example, is a crankshaft W. Portions to be grinded by the grinder 11 are a crank journal, a crank pin, and the like of the crankshaft.

The grinder 11 is configured as below. A bed 111 is fixed to an installation face, and a main spindle device 112 and a tailstock device 113 that support a crankshaft W to be rotatable at both ends are attached to the bed 111. The crankshaft W is supported by the main spindle device 112 and the tailstock device 113 to be rotatable on the crank journal as the center. The main spindle device 112 includes a motor 112a that drives the crankshaft W to rotate. A detector (vibration sensor) 112b that detects a vibration of the main spindle is attached to the main spindle device 112.

In addition, on the bed 111, a grinding wheel base 114 that can be moved in a Z-axis direction (an axial direction of the crankshaft W) and an X-axis direction (a direction perpendicular to the axis of the crankshaft W) is disposed. The grinding wheel base 114 is moved in the Z-axis direction by a motor 114a and is moved in the X-axis direction by a motor 114b. In addition, in the grinding wheel base 114, a detector 114c that detects the position of the grinding wheel base 114 in the Z direction and a detector 114d that detects the position of the grinding wheel base 114 in the X direction are disposed. The detectors 114c and 114d are rotary encoders measuring the rotation or the like of the motor 114b or the like and may be configured as linear position detectors of a linear scale or the like.

In the grinding wheel base 114, a grinding wheel 115 that grinds the crank pin or the crank journal is disposed to be rotatable. The grinding wheel 115 is driven to rotate by a motor 115a. In addition, in the grinding wheel base 114, a detector 115b that detects the power or the like of the motor 115a is disposed. While the detector 115b, for example, is a motor wattmeter, the detector may be configured as a voltage meter or a current meter measuring the voltage or the current of the motor 115a or the like. Here, by using the power, the voltage, the current, or the like of the motor 115a of the grinding wheel 115, grinding resistance can be indirectly acquired. Alternatively, the detector 115b may be configured as a load detector disposed in the main spindle device 112 or the grinding wheel base 114 so as to directly acquire grinding resistance.

In addition, in the bed 111, a sizing device 116 that measures the outer diameter of the crank pin or the crank journal that is a grinding portion of the crankshaft W is disposed. Furthermore, in the bed 111, a detector 117 that detects an environmental temperature (the temperature of the outer air) is disposed. In addition, in the bed 111, a pump 118a that is used for supplying coolant to a grinding portion, a valve 118b that performs switching on/off of the supply of the coolant, and a detector 118c that detects the state of the valve 118b are provided. While the detector 118c is a coolant flowmeter, the detector may be configured as a pressure sensor that detects the pressure of the coolant or the like.

In addition, the grinder 11 includes a CNC device 121, a PLC 122, an abnormality determination apparatus 123, and an operation board 124. Here, the abnormality determination apparatus 123 may be configured as a built-in system of the CNC device 121 or the PLC 122 or be configured as a personal computer, a server, or the like.

Figure 3:
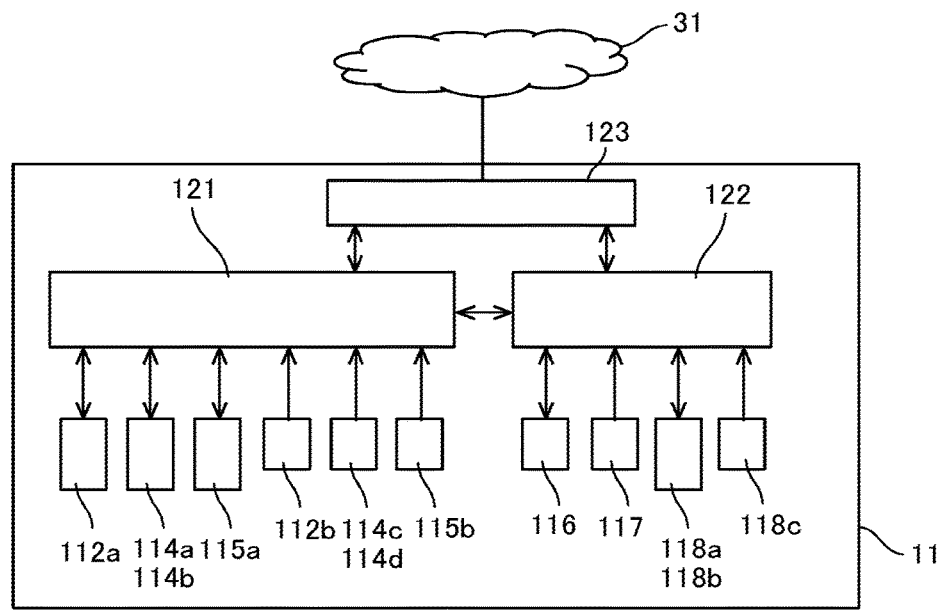
FIG. 3 is a block diagram of a production facility.

The CNC device 121, as illustrated in FIG. 3 controls the motors 112a and 115a rotating the main spindle device 112 and the grinding wheel 115 and controls the motors 114a and 114b relatively moving the grinding wheel 115 with respect to the crankshaft W. When the control process is performed, the CNC device 121 acquires information from the detectors 114c and 114d detecting the positions of the grinding wheel base 114 and the detector 115b detecting the power of the motor 115a.

The PLC 122 acquires detection information from the sizing device 116. In addition, the PLC 122 controls the pump 118a and the valve 118b, thereby controlling the supply of the coolant. When this control process is performed, the PLC 122 acquires detection information of the detector 118c that detects the state of the valve 118b. In addition, the PLC 122 acquires detection information of the detector 117 that detects an environmental temperature.

Here, all the sampling periods of the detectors 112b, 114c, 114d, 115b, 116, 117, and 118c are not the same, but at least some thereof are different. For example, the sampling period of the detector 115b detecting the power of the motor 115a is several msec, the sampling period of the sizing device 116 is several msec, the sampling period of the detector 118c detecting the state of the valve is several tens of msec, and the sampling period of the detector 117 detecting the temperature is several tens of msec. Each sampling period is appropriately adjusted according to a control method.

The abnormality determination apparatus 123 determines an abnormality of the grinder 11 or an abnormality of a production object (workpiece). The abnormality determination apparatus 123 stores thresholds corresponding to a determination object and performs an abnormality determination by comparing the detection information acquired by each of the detectors 112b, 114c, 114d, 115b, 116, 117, and 118c with corresponding thresholds.

Figure 4:
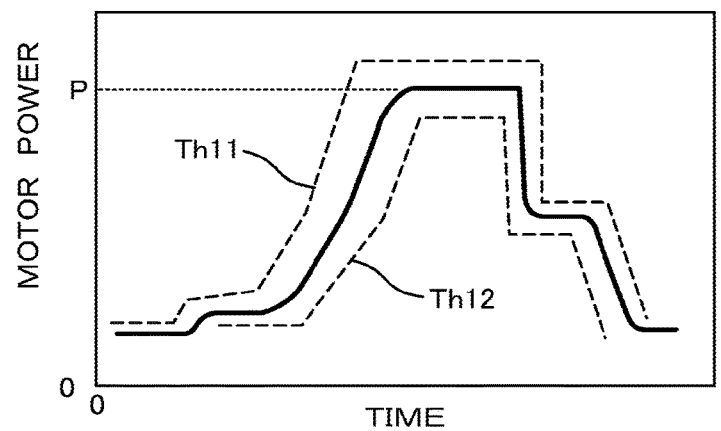
FIG. 4 is a diagram that illustrates the behavior of power of a motor of a grinding wheel with respect to an elapsed time after the start of grinding of one production object.

For example, the abnormality determination apparatus 123, as illustrated in FIG. 4, for one production object (workpiece), stores thresholds Th11 and Th12, which are used for a comparison with the detection information acquired by the detector 115b detecting the power of the motor 115a, in advance. The thresholds Th11 and Th12 are set to be changed according to the behavior of the power of the motor 115a with respect to an elapsed time from the start of grinding for one production object (workpiece). The threshold Th11 is an upper limit value, and the threshold Th12 is a lower limit value.

The abnormality determination apparatus 123 determines an abnormality of a production object by comparing the power of the motor 115a with the thresholds Th11 and Th12. More specifically, in a case where the power of the motor 115a is over the upper limit threshold Th11 or below the lower limit threshold Th12, the abnormality determination apparatus 123 determines an occurrence of a grinding burn or a state not satisfying a shape precision in the production object and determines that the production object is abnormal. Here, the power of the motor 115a of the grinding wheel 115 corresponds to grinding resistance. Thus, instead of the power of the motor 115a of the grinding wheel 115, grinding resistance detected using another detection method may be used. A determination of whether or not a grinding burn or the like occurs in a production object through a comparison between the grinding resistance and the thresholds, for example, is disclosed in JP2013-129027A.

In addition, the abnormality determination apparatus 123 determines abnormalities of the drive devices 112a, 114a, 114b, 115a, 118a, and 118b of control objects of the CNC device 121 and the PLC 122. For example, the abnormality determination apparatus 123 compares use result values acquired from information such as the use states and the use history of the motors 114a and 114b with thresholds stored in advance, thereby determining abnormalities of a ball screw, a bearing, and the like used in the drive mechanism. In addition, the abnormality determination apparatus 123 compares use result values acquired from information such as the use states and the use history of the valve 118b with thresholds stored in advance, thereby determining an abnormality of the valve 118b. Here, an abnormality of the drive mechanism and an abnormality of the valve 118b represent a meaning including not only a breakdown of the drive mechanism and the valve 118b but also a life and a state requiring maintenance.

Here, the thresholds stored in the abnormality determination apparatus 123 have values that are different according to a target grinder 11. In the case illustrated in FIG. 1, also in a case where the production facility 11 and the other production facility 21 produce objects of a same kind, there is a difference between the use environments thereof or a difference between the material compositions of the production objects. In addition, there are also cases where there is an individual difference in the production facilities 11 and 21. Thus, also in a case where objects of a same kind are produced, there are cases where the threshold of the production facility 11 and the threshold of the production facility 21 are set to mutually-different values.

In the description presented above, while the production facility 11 has been described, the description similarly applies also to the production facilities 13, 21, and 23 as grinders. In addition, each of the production facilities 12 and 22 as conveyance devices similarly includes an abnormality determination apparatus 123. In this case, the abnormality determination apparatus 123, for example, can determine an abnormality (a breakdown, a life, or a state requiring maintenance) of a component configuring a conveyance path by comparing use result values acquired from information such as the use states and the use histories of the production facilities 12 and 22 as conveyance devices with thresholds stored in advance. As illustrated in FIG. 2, while the abnormality determination apparatus 123 is disposed inside the production facility 11, the abnormality determination apparatus may be disposed inside the analysis apparatus 50.

(1-3. Configuration of Analysis Apparatus 50)

Next, the configuration of the analysis apparatus 50 will be described with reference to FIG. 5. The analysis apparatus 50 is connected to the detectors 112*b*, 114*c*, 114*d*, 115*b*, 116, 117, and 118*c* of the production facilities 11 to 13 through the fog network 31. The analysis apparatus 50 acquires detection information acquired by the detectors 112*b*, 114*c*, 114*d*, 115*b*, 116, 117, and 118*c* of the production facilities 11 to 13 through the fog network 31. In addition, the analysis apparatus 50 is also connected to the CNC device 121 and the PLC 122 of the production facilities 11 to 13. The analysis apparatus 50 acquires various control parameters through the fog network 31.

The fog network 31 is built in an area that is narrower than that of the cloud network 40. Accordingly, the analysis apparatus 50 can acquire the detection information acquired by the detectors 112*b*, 114*c*, 114*d*, 115*b*, 116, 117, 118*c* of the production facilities 11 to 13 early from detection time points.

Figure 5:
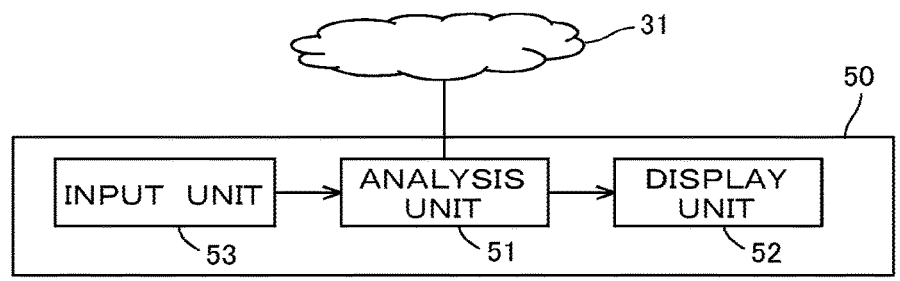
FIG. 5 is a diagram that illustrates the configuration of an analysis apparatus illustrated in FIG. 1.

The analysis apparatus 50, as illustrated in FIG. 5, includes: an analysis unit 51, a display unit 52, and an input unit 53. The analysis unit 51 acquires the detection information acquired by the detectors 112*b*, 114*c*, 114*d*, 115*b*, 116, 117, and 118*c* of the production facilities 11 to 13. Here, the analysis unit 51 acquires all the detection information detected by the detectors 112*b*, 114*c*, 114*d*, 115*b*, 116, 117, and 118*c*. In other words, the analysis unit 51 acquires all the detection information regardless of the sampling periods of the detectors 112*b*, 114*c*, 114*d*, 115*b*, 116, 117, and 118*c*. Here, since the analysis unit 51 acquires all the detection information, the amount of data is huge. However, since the detection information is acquired through the fog network 31, a communication time delay does not cause any problem.

In addition, the analysis unit 51 acquires various control parameters of the production facilities 11 to 13 in addition to the detection information acquired by the detectors 112*b*, 114*c*, 114*d*, 115*b*, 116, 117, and 118*c*. For example, the control parameters of the production facilities 11 and 13 include the shape and the material of the crankshaft W as a production object, the shape and the material of the grinding wheel 115, and grinding process information such as a grinding/cutting depth, and the flow rate of the coolant.

The analysis unit 51 performs a data analysis based on the detection information and the various control parameters that have been acquired. The data analysis is so-called data mining. Particularly, the analysis unit 51 acquires not only the detection information acquired by the detectors 112*b*, 114*c*, 114*d*, 115*b*, 116, 117, and 118*c* and the like of one production facility 11 but also the detection information acquired by the detectors 112*b*, 114*c*, 114*d*, 115*b*, 116, 117, and 118*c* of a plurality of the production facilities 11 to 13 and the like.

Then, the analysis unit 51 can generate determination information relating to an abnormality of a production object through the data analysis and stores the determination information. For example, the analysis unit 51 generates thresholds Th11 and Th12 (illustrated in FIG. 4) used for a determination of the presence/absence of a grinding burn of a production object through the data analysis as one piece of the determination information. In addition, the analysis unit 51 generates thresholds used for determining abnormalities of components of the production facilities 11 to 13 through the data analysis as another piece of the determination information. Furthermore, after generating the determination information once, the analysis unit 51 acquires new detection information, thereby updating the determination information.

The display unit 52 can allow an operator to check a result of the data analysis by displaying the determination information as a result of the data analysis performed by the analysis unit 51. In addition, the display unit 52 also can display the detection information and the various control parameters acquired by the analysis unit 51. For example, the display unit 52 displays a threshold used for determining the presence/absence of a grinding burn acquired by the analysis unit 51, detection information acquired by the detector 115*b* detecting the power of the motor 115*a* of the production facility 11, and detection information acquired by the detector 115*b* detecting the power of the motor 115*a* of the production facility 13 in an overlapping manner.

The input unit 53 receives input of the determination information and the like from the operator. The input unit 53 can set determination information corresponding to each of the production facilities 11 to 13. The analysis unit 51 can acquire the determination information corresponding to each of the production facilities 11 to 13, and the operator can arbitrarily edit the determination information while referring to the acquired determination information. The edited determination information is stored in the analysis unit 51.

Then, the production facilities 11 to 13 acquire the determination information stored in the analysis unit 51 through the fog network 31 and store the acquired determination information. The abnormality determination apparatus 123 of the production facilities 11 to 13 determines an abnormality of the production facilities 11 to 13 or abnormality of the production objects based on the acquired determination information.

(1-4. Detailed Process of Abnormality Determination Apparatus 123, Analysis Apparatuses 50 and 60, and Higher-rank Analysis Apparatus 70)

Figure 6:
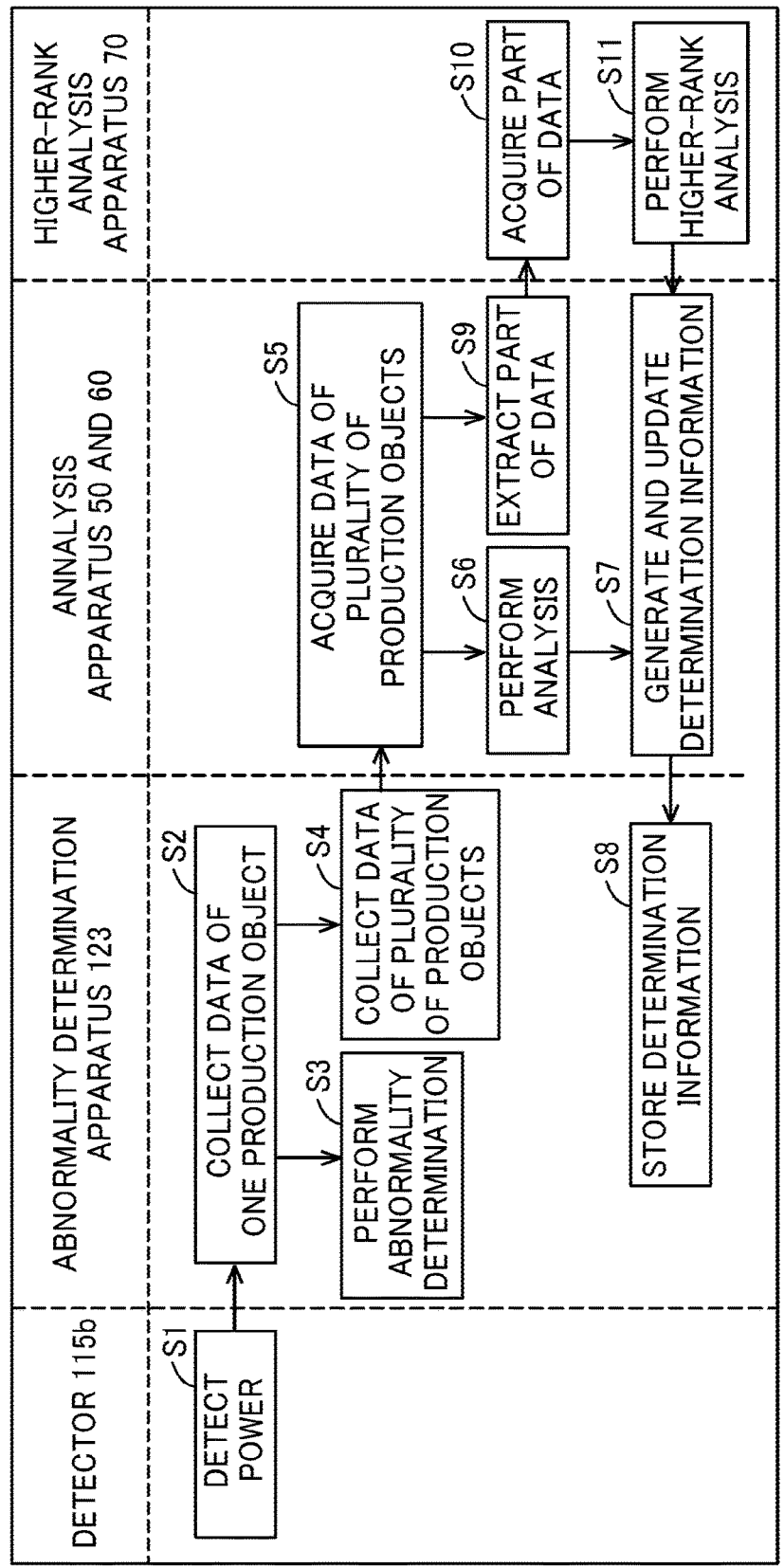
FIG. 6 illustrates the detailed processing flow of an abnormality determination apparatus, an analysis apparatus, and a higher-rank analysis apparatus according to a first embodiment.

Next, detailed processes of the abnormality determination apparatus 123, the analysis apparatuses 50 and 60, and the higher-rank analysis apparatus 70 will be described with reference to FIG. 6. The analysis apparatuses 50 and 60 and the higher-rank analysis apparatus 70 acquire the detection information acquired by the detectors 112*b*, 114*c*, 114*d*, 115*b*, 116, 117, and 118*c* and generate various kinds of determination information. For the simplification of description, hereinafter, a process performed in a case where the detection information acquired by the detector 115*b* is used will be described as an example.

The detector 115*b* detects the power of the motor 115*a* every time when the production object (workpiece) is grinded (S1). Subsequently, the abnormality determination apparatus 123 collects data for one production object (S2). This data, for example, is a behavior represented using a solid line in FIG. 4. Then, in a case where the thresholds Th11 and Th12 as the determination information are stored in the abnormality determination apparatus 123 in advance, the abnormality determination apparatus 123 performs an abnormality determination (S3). In other words, the abnormality determination apparatus 123 determines whether or not a production object is abnormal by comparing the data for one production object with the thresholds Th11 and Th12 stored in advance.

In addition, the abnormality determination apparatus 123 collects data of a plurality of production objects (S4). The abnormality determination apparatus 123, for example, collects data of the production objects corresponding to one day. The data of the plurality of production objects collected by the abnormality determination apparatus 123, for example, is transmitted to the analysis apparatuses 50 and 60 through the fog networks 31 and 32, for example, once a day. Then, the analysis apparatuses 50 and 60 acquire the detection information acquired by the detector 115b for the plurality of the production objects, for example, once a day (S5). Here, the analysis apparatuses 50 and 60 acquire all the detection information acquired by the detector 115b.

The analysis apparatuses 50 and 60 perform data analyses based on the detection information of a plurality of production objects that is acquired by the detector 115b (S6). Then, the analysis apparatuses 50 and 60 generate thresholds Th11 and Th12 as the determination information through the data analyses (S7). In addition, in a case where the detection information that is newly acquired by the detector 115b is acquired, the analysis apparatuses 50 and 60 perform data analyses again, thereby updating the thresholds Th11 and Th12 as the determination information (S7). Then, the analysis apparatuses 50 and 60 transmit the thresholds Th11 and Th12 as the determination information to the abnormality determination apparatus 123 through the fog networks 31 and 32. Then, the abnormality determination apparatus 123 stores the thresholds Th11 and Th12 as the determination information while sequentially updating the thresholds (S8).

In parallel with the data analyses used for generating the thresholds Th11 and Th12 as the determination information, the analysis apparatuses 50 and 60 extract only a part of information among the acquired detection information acquired by the detector 115b (S9). For example, the analysis apparatuses 50 and 60 extract the power P of the motor 115a at the time of performing normal processing in the case illustrated in FIG. 4. The analysis apparatuses 50 and 60 transmit the extracted information to the higher-rank analysis apparatus 70 through the cloud network 40. The transmission, for example, may be performed once a day or once a month.

Then, the higher-rank analysis apparatus 70 acquires a part of the detection information acquired by the detector 115b through the cloud network 40 (S10). In addition, as is necessary, the higher-rank analysis apparatus 70 acquires various kinds of control parameters from the analysis apparatuses 50 and 60. The data amount of the various kinds of control parameters is smaller than that of the detection information.

The data communication amount of the cloud network 40 is remarkably smaller than the data communication amounts of the fog networks 31 and 32. Even in a case where the analysis apparatus 50 and the other analysis apparatus 60 are located far away from the higher-rank analysis apparatus 70, the problem of a delay in the communication speed through the cloud network 40 does not occur.

The higher-rank analysis apparatus 70 performs a higher-rank data analysis based on a part of the detection information and the various control parameters acquired from the analysis apparatuses 50 and 60 (S11). The higher-rank data analysis is so-called data mining. The higher-rank analysis apparatus 70 performs the higher-rank data analysis by using the information of the production facilities 11 to 13 and the production facilities 21 to 23 installed in mutually-different areas. Accordingly, the higher-rank analysis apparatus 70 can perform the higher-rank data analysis using a large quantity of information.

In a case where the installation places of the production facilities 11 to 13 and the other production facilities 21 to 23 are different from each other, there are cases where the environmental temperatures of both the places are different. For example, the higher-rank analysis apparatus 70 can perform the higher-rank data analysis with the influence of the environmental temperatures considered in more detail.

The analysis apparatuses 50 and 60 can acquire a result of the higher-rank data analysis performed by the higher-rank analysis apparatus 70 through the cloud network 40. Accordingly, the analysis apparatuses 50 and 60 update the thresholds Th11 and Th12 as the determination information generated by its own data analysis by referring to the result of the higher-rank data analysis (S7). Then, the analysis apparatuses 50 and 60 transmit the thresholds Th11 and Th12 as updated determination information to the abnormality determination apparatus 123 through the fog networks 31 and 32. In this way, the abnormality determination apparatus 123 stores the thresholds Th11 and Th12 as determination information acquired in consideration of the result of the higher-rank data analysis while sequentially updating the thresholds (S8).

Here, the display unit 52 of the analysis apparatus 50 can display the determination information as the result of the own data analysis performed by the analysis apparatus 50 and the determination information as the result of the higher-rank data analysis performed by the higher-rank analysis apparatus 70 in an overlapping manner. An operator can set the determination information used by the production facilities 11 to 13 by using the input unit 53 while checking both the determination information. This similarly applies to the analysis apparatus 60 as well.

The analysis apparatuses 50 and 60 can transmit a part or the whole of the collected data to the higher-rank analysis apparatus 70. The range (a range set by the magnitude of a value, a time, or the like) of data transmitted by the analysis apparatuses 50 and 60 can be determined as a place close to the production facilities 11 to 13 by the analysis apparatuses 50 and 60 or in cooperation with an operator's operation.

<2. Second Embodiment>

Detailed processes performed by an abnormality determination apparatus 123, analysis apparatuses 50 and 60, and a higher-rank analysis apparatus 70 according to a second embodiment will be described with reference to FIGS. 7 to 12. In the second embodiment, a case will be described as an example in which detection information acquired by a detector 112b is used.

Figure 7:
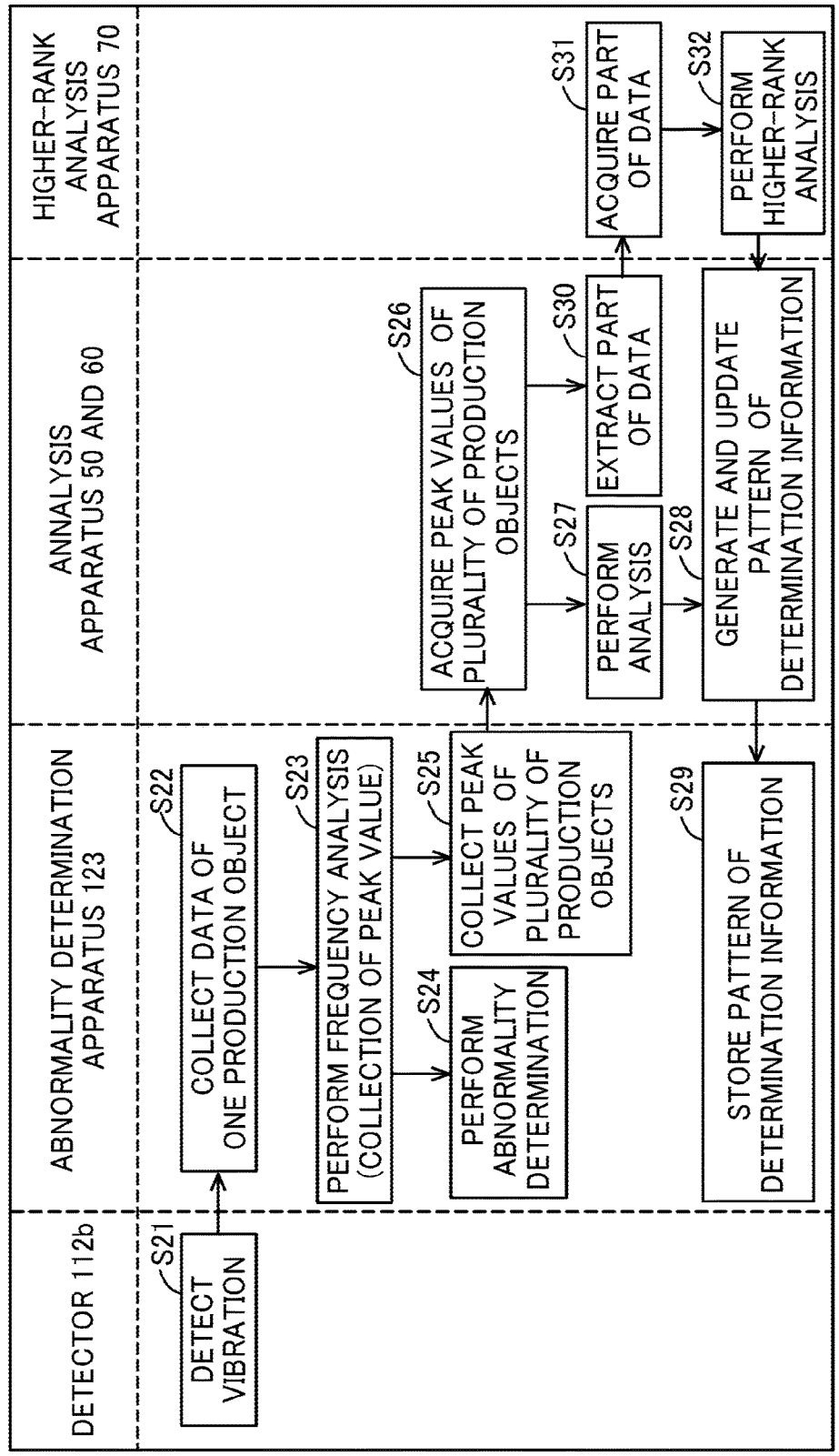
FIG. 7 illustrates the detailed processing flow of an abnormality determination apparatus, an analysis apparatus, and a higher-rank analysis apparatus according to a second embodiment.
Figure 8:
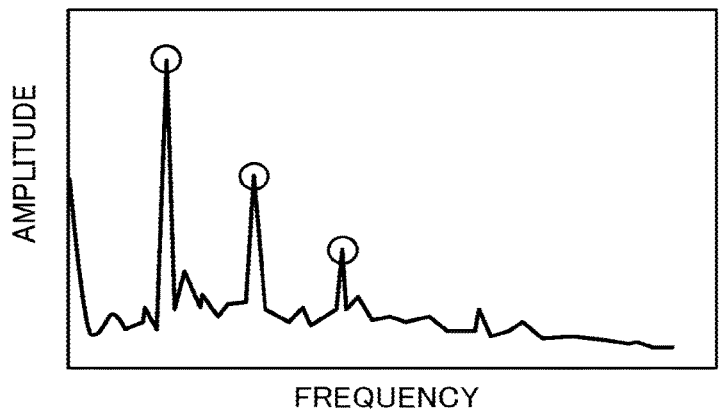
FIG. 8 is a graph that illustrates a result of a frequency analysis performed by the abnormality determination apparatus according to the second embodiment.

As illustrated in FIG. 7, the detector 112b detects a vibration of a main spindle every time when a production object (workpiece) is grinded (S21). Subsequently, the abnormality determination apparatus 123 collects data for one production object (S22). Subsequently, the abnormality determination apparatus 123 performs a frequency analysis (corresponding to a predetermined process according to the invention) for the vibration data of one production object (S23). A result of the frequency analysis is illustrated in FIG. 8. Then, the abnormality determination apparatus 123 acquires peak values (corresponding to post-process data according to the invention) of a predetermined frequency band of the vibration data acquired through the frequency analysis.

Here, as illustrated in FIG. 8, the result of the frequency analysis has peak values (enclosed by circles in FIG. 8) in a plurality of frequency bands. Such frequency bands correspond to causes of vibrations of the main spindle. For example, the frequency band is different according to a case where there is a damage in the outer ring of a bearing of a main spindle device 112, a case where there is a damage in the inner ring, a case where there is a damage in a rolling element, or the like. Thus, the abnormality determination apparatus 123 acquires a peak value of a frequency band corresponding to each vibration cause.

Figure 9:
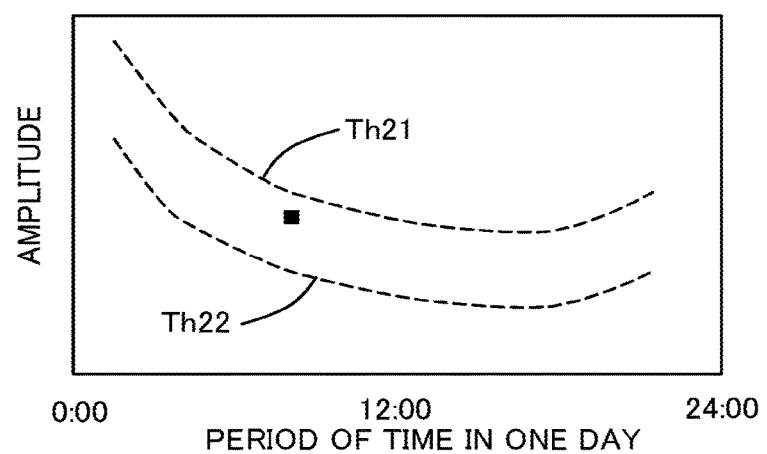
FIG. 9 is a diagram that illustrates a first example of an abnormality determination performed by the abnormality determination apparatus according to the second embodiment and is a diagram that illustrates a peak value (evaluation parameter) of the amplitude of vibrations for a time period (regulation parameter) of one day.

Then, in a case where thresholds Th21 and Th22 are stored in advance as a pattern of determination information, the abnormality determination apparatus 123 performs an abnormality determination (S24). The thresholds Th21 and Th22 as the pattern of the determination information, for example, as illustrated in FIG. 9, represent a pattern of peak values (evaluation parameter) of the frequency analysis of the vibration data for time periods (regulation parameter) of one day. Here, also during one day, the magnitude of the vibration is different according to an elapsed time after the startup of the production facilities 11 to 13, an environmental temperature, and the like. Thus, as illustrated in FIG. 9, the thresholds Th21 and Th22 as the pattern of the determination information are represented as peak values (evaluation parameter) of the frequency analysis of the vibration data in the vertical axis with the horizontal axis set to the time period (regulation parameter) of one day.

In other words, the abnormality determination apparatus 123 performs an abnormality determination based on a currently-acquired actual period (regulation parameter) of time, a currently-acquired actual peak value (evaluation parameter), and the pattern of the stored determination information. Here, a mark ■ illustrated in FIG. 9 is a peak value for an actual period of time that is currently acquired. The mark ■ is equal to or less than an upper-limit threshold Th21 and equal to or more than a lower-limit threshold Th22, and accordingly, a normality is determined.

Figure 10:
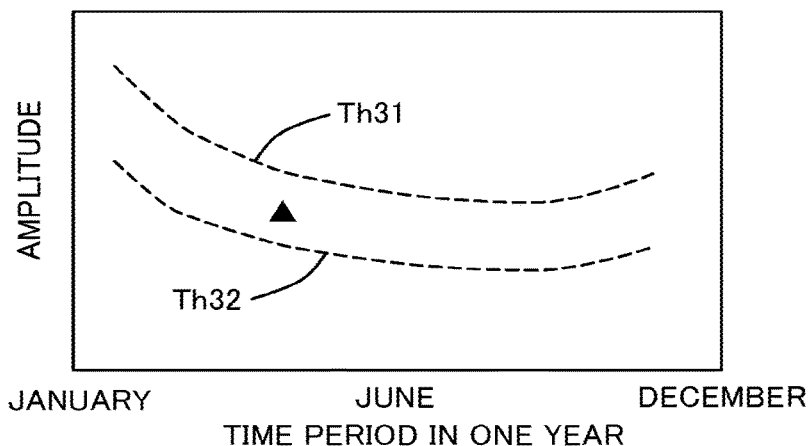
FIG. 10 is a diagram that illustrates a second example of an abnormality determination performed by the abnormality determination apparatus according to the second embodiment and is a diagram that illustrates a peak value (evaluation parameter) of the amplitude of vibrations for a time period (regulation parameter) of one year.

In addition, the abnormality determination apparatus 123, for example, as illustrated in FIG. 10, as thresholds Th31 and Th32 as a pattern of another determination information, stores a pattern of peak values (evaluation parameters) of the frequency analysis of the vibration data for a time period (regulation parameter) of one year. Here, also during one year, the magnitude of the vibration is different according to the influence of a difference in the environmental temperature. Thus, as illustrated in FIG. 10, the thresholds Th31 and Th32 as the pattern of another determination information are represented as peak values (evaluation parameters) of the frequency analysis of the vibration data in the vertical axis with the horizontal axis set to a time period (regulation parameter) of one year.

In other words, the abnormality determination apparatus 123 performs an abnormality determination based on an actual time period (regulation parameter) that is currently acquired, actual peak values (evaluation parameters) that are currently acquired, and the pattern of the stored determination information. Here, in FIG. 10, a mark ▲ is a peak value of the actual time period that is currently acquired. Since the mark ▲ is equal to or less than the upper-limit threshold Th31 and equal to or more than the lower-limit threshold Th32, a normality is determined.

In addition, the abnormality determination apparatus 123 collects peak values (post-processing data) of a plurality of production objects (S25). The abnormality determination apparatus 123, for example, collects peak values of the production objects corresponding to one day. The peak values of the plurality of production objects collected by the abnormality determination apparatus 123 are transmitted to the analysis apparatuses 50 and 60 through the fog networks 31 and 32, for example, once a day. Then, the analysis apparatuses 50 and 60 acquire peak values of the frequency analysis of vibration data for the plurality of production objects, for example, once a day (S26). Here, the analysis apparatuses 50 and 60 acquire peak values of a data amount that is much smaller than that of the detection information acquired by the detector 112b.

Figure 11:
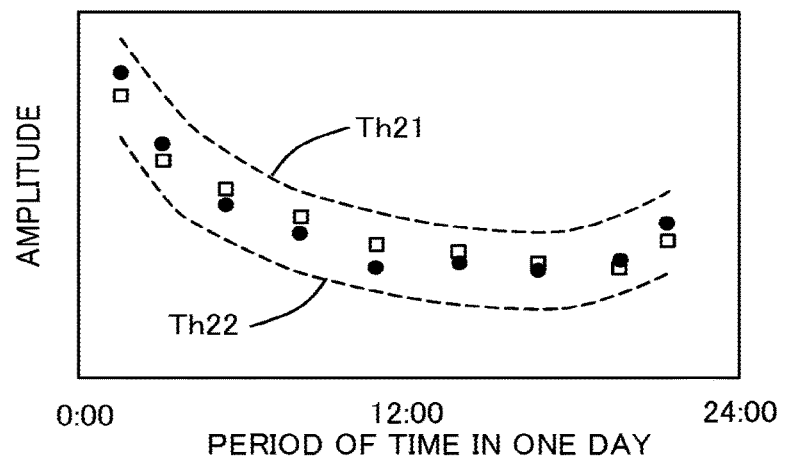
FIG. 11 is a diagram that illustrates the generation of a pattern of determination information according to a first example performed by the analysis apparatus according to the second embodiment.

The analysis apparatuses 50 and 60 perform data analyses based on the peak values for the plurality of production objects (S27). For example, a distribution of peak values corresponding to two days is illustrated in FIG. 11. Then, the analysis apparatuses 50 and 60 analyze a normal tendency pattern based on the peak values corresponding to a plurality of days. The normal tendency pattern may be an approximation curve (for example, a least-square approximation curve) of distributed data or a curve having a width including all the distributed data. Then, the analysis apparatuses 50 and 60, based on the normal tendency pattern, generate thresholds Th21 and Th22 as a pattern of the determination information as represented by a broken line in FIG. 11 (S28).

In addition, in a case where the detection information acquired by the detector 112b is newly acquired, the analysis apparatuses 50 and 60 perform data analyses again, thereby updating the thresholds Th21 and Th22 as a pattern of the determination information (S28). Then, the analysis apparatuses 50 and 60 transmit the thresholds Th21 and Th22 as the pattern of the determination information to the abnormality determination apparatus 123 through the fog networks 31 and 32. Then, the abnormality determination apparatus 123 stores the thresholds Th21 and Th22 as the pattern of the determination information, while sequentially updating the thresholds (S29).

Figure 12:
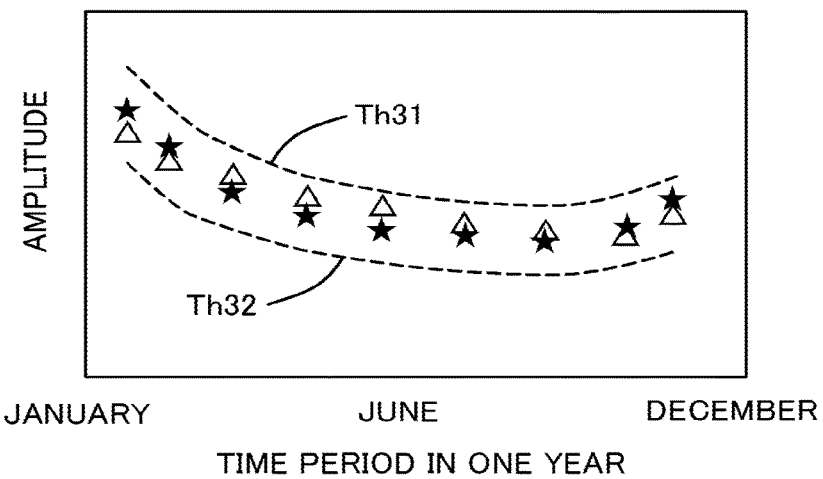
FIG. 12 is a diagram that illustrates the generation of a pattern of determination information according to a second example performed by the analysis apparatus according to the second embodiment.

In addition, the analysis apparatuses 50 and 60 perform data analyses based on the peak values for the production object corresponding to one year (S27). For example, a distribution of the peak values corresponding to one year is illustrated in FIG. 12. Then, the analysis apparatuses 50 and 60 analyze the normal tendency pattern based on the peak values corresponding to one year. Then, the analysis apparatuses 50 and 60, based on the normal tendency pattern, as represented by a broken line in FIG. 12, generate thresholds Th31 and Th32 as the pattern of the determination information (S28).

Also in this case, similarly, in a case where the detection information acquired by the detector 112b is newly acquired, the analysis apparatuses 50 and 60 perform the data analyses again, thereby updating the thresholds Th31 and Th32 as the pattern of the determination information (S28). Then, the analysis apparatuses 50 and 60 transmit the thresholds Th31 and Th32 as the pattern of the determination information to the abnormality determination apparatus 123 through the fog networks 31 and 32. Then, the abnormality determination apparatus 123 stores the thresholds Th31 and Th32 as the pattern of the determination information while sequentially updating the thresholds (S29).

In parallel with the data analyses used for generating the thresholds Th21, Th22, Th31, and Th32 as the determination information, the analysis apparatuses 50 and 60 extract only a part of information among the acquired peak values (S30). For example, the analysis apparatuses 50 and 60 extract not peak values of all the production objects but peak values of some production objects. The analysis apparatuses 50 and 60, for example, extract peak values of one production object from a same lot. The analysis apparatuses 50 and 60 transmit the extracted information to the higher-rank analysis apparatus 70 through the cloud network 40. The transmission, for example, may be performed once a week or once a month.

Then, the higher-rank analysis apparatus 70 acquires a part of the information of the peak values through the cloud network 40 (S31). In addition, as is necessary, the higher-rank analysis apparatus 70 acquires various kinds of control parameters from the analysis apparatuses 50 and 60. The data amount of the various kinds of control parameters is smaller than that of the detection information.

The higher-rank analysis apparatus 70 performs a higher-rank data analysis based on a part of the peak values and various kinds of control parameters acquired from the analysis apparatuses 50 and 60 (S32). The higher-rank data analysis is so-called data mining. The higher-rank analysis apparatus 70 performs the higher-rank data analysis by using the information of the production facilities 11 to and the production facilities 21 to 23 installed in mutually-different areas. Accordingly, the higher-rank analysis apparatus 70 can perform the higher-rank data analysis using a large quantity of information.

The analysis apparatuses 50 and 60 can acquire a result of the higher-rank data analysis performed by the higher-rank analysis apparatus 70 through the cloud network 40. Accordingly, the analysis apparatuses 50 and 60 update the thresholds Th21, Th22, Th31, and Th32 as the pattern of the determination information generated by its own data analysis by referring to the result of the higher-rank data analysis (S28). Then, the analysis apparatuses 50 and 60 transmit the thresholds Th21, Th22, Th31, and Th32 as updated determination information to the abnormality determination apparatus 123 through the fog networks 31 and 32. In this way, the abnormality determination apparatus 123 stores the thresholds Th21, Th22, Th31, and Th32 as determination information acquired in consideration of the result of the higher-rank data analysis while sequentially updating the thresholds (S29).

<3. Third Embodiment>

Figure 14:
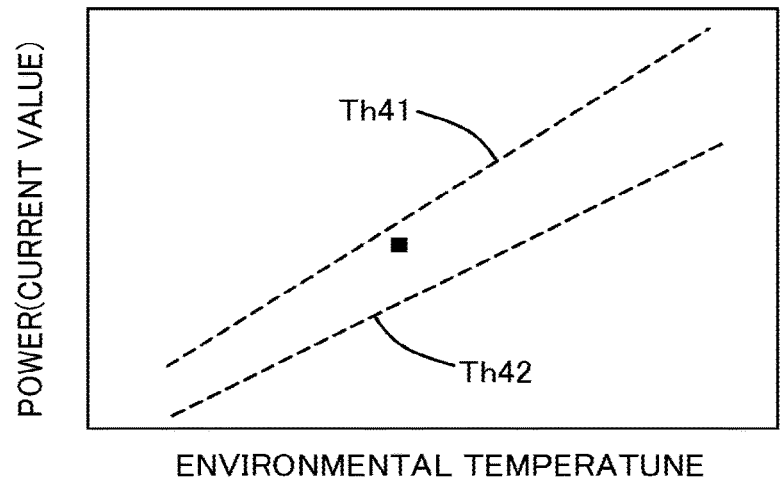
FIG. 14 is a diagram that illustrates an abnormality determination performed by the abnormality determination apparatus according to the third embodiment and is a diagram that illustrates a current value (evaluation parameter) of the power of a motor at an environmental temperature (regulation parameter).
Figure 15:
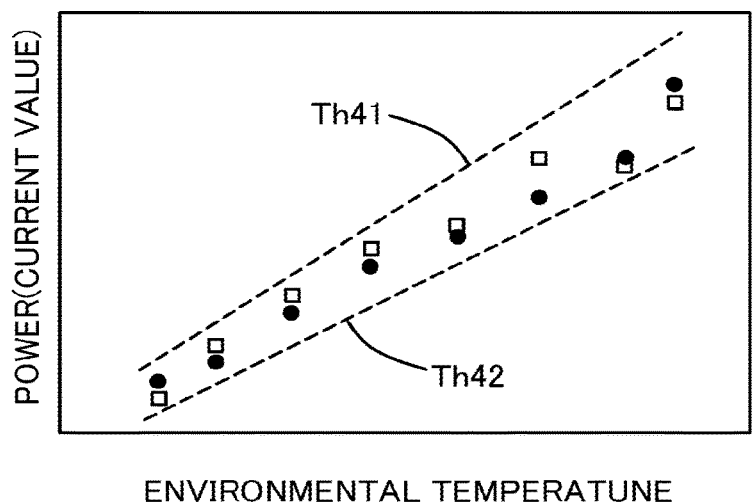
FIG. 15 is a diagram that illustrates the generation of a pattern of determination information performed by the analysis apparatus according to the third embodiment.

Detailed processes performed by an abnormality determination apparatus 123, analysis apparatuses 50 and 60, and a higher-rank analysis apparatus 70 according to a third embodiment will be described with reference to FIGS. 13 to 15. In the third embodiment, a case will be described as an example in which detection information acquired by detectors 115b and 117 is used.

Figure 13:
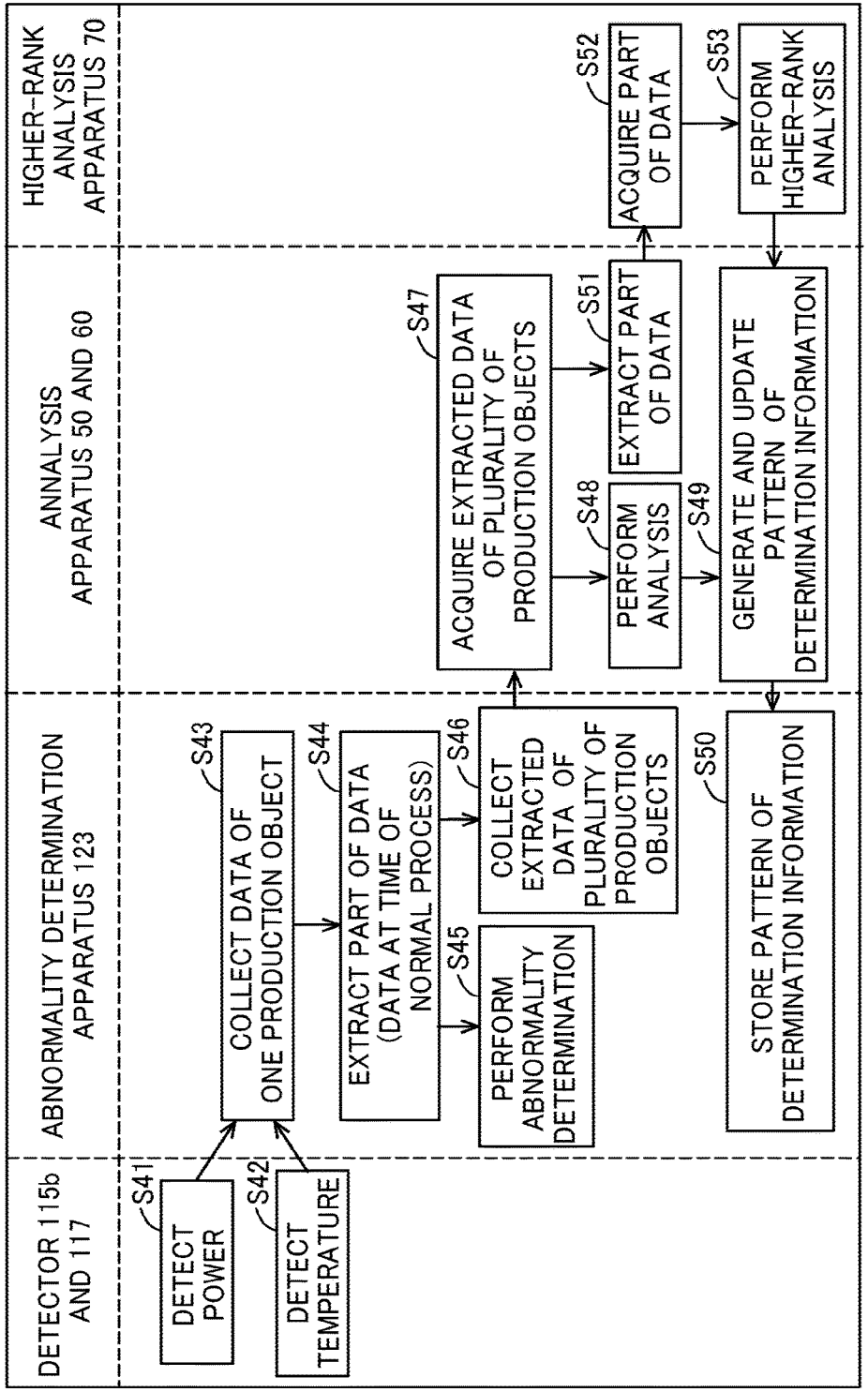
FIG. 13 illustrates the detailed processing flow of an abnormality determination apparatus, an analysis apparatus, and a higher-rank analysis apparatus according to a third embodiment.

As illustrated in FIG. 13, the detector 115b detects a current value of the power of a motor 115a every time when a production object (workpiece) is grinded (S41). In addition, the detector 117 detects an environmental temperature every time when the production object is grinded (S42). Subsequently, the abnormality determination apparatus 123 collects data for one production object (S43).

Subsequently, the abnormality determination apparatus 123 extracts data at the time of performing normal processing from among power data of the motor 115a for one production object (corresponding to a predetermined process according to the invention) (S44). For example, in the case illustrated in FIG. 4, the current value of the power of the motor 115a at the time of performing normal processing is P. Then, the abnormality determination apparatus 123 acquires data of the current value P of the power and data (corresponding to post-process data according to the invention) of the environmental temperature acquired by the extraction process.

Then, in a case where thresholds Th41 and Th42 are stored in advance as a pattern of determination information, the abnormality determination apparatus 123 performs an abnormality determination (S45). The thresholds Th41 and Th42 as the pattern of the determination information, for example, as illustrated in FIG. 14, represent a pattern of the current value (evaluation parameter) of the power of the motor 115a for the environmental temperature (regulation parameter). Here, the current value of the power of the motor 115a is changed according to the environmental temperature. Thus, as illustrated in FIG. 14, the thresholds Th41 and Th42 as the pattern of the determination information are represented as current values P (evaluation parameter) of the power of the motor 115a in the vertical axis with the horizontal axis set to the environmental temperature (regulation parameter).

In other words, the abnormality determination apparatus 123 performs an abnormality determination based on a currently-acquired actual environmental temperature (regulation parameter), a currently-acquired actual current value P (evaluation parameter) of the power, and the pattern of the stored determination information. Here, a mark ■ illustrated in FIG. 14 is a current value P of the power for an actual environmental temperature that is currently acquired. The mark ■ is equal to or less than an upper-limit threshold Th41 and equal to or more than a lower-limit threshold Th42, and accordingly, a normality is determined.

In addition, the abnormality determination apparatus 123 collects a plurality of pieces of data of the current value P of the power and a plurality of data of the environmental temperature (post-processing data) (S46). The abnormality determination apparatus 123, for example, collects the data of the current value P of the power of the production object and the data of the environmental temperature corresponding to one day. The plurality of pieces of data collected by the abnormality determination apparatus 123 are transmitted to the analysis apparatuses 50 and 60 through fog networks 31 and 32, for example, once a day. Then, the analysis apparatuses 50 and 60 acquire the data of the current value P of the power and the data of the environmental temperature for a plurality of production objects, for example once a day (S47). Here, the analysis apparatuses 50 and 60 acquire data having a data amount that is much smaller than that of all the detection information of the detectors 115b and 117.

The analysis apparatuses 50 and 60 perform data analyses based on the data for the plurality of production objects (S48). For example, a distribution of data corresponding to a plurality of days having mutually-different environmental temperatures is illustrated in FIG. 15. Then, the analysis apparatuses 50 and 60 analyze a normal tendency pattern based on the data corresponding to a plurality of days. Then, the analysis apparatuses 50 and 60, based on the normal tendency pattern, generate thresholds Th41 and Th42 as a pattern of the determination information as represented by a broken line in FIGS. 14 and 15 (S49).

In addition, in a case where the detection information acquired by the detectors 115b and 117 is newly acquired, the analysis apparatuses 50 and 60 perform data analyses again, thereby updating the thresholds Th41 and Th42 as a pattern of the determination information (S49). Then, the analysis apparatuses 50 and 60 transmit the thresholds Th41 and Th42 as the pattern of the determination information to the abnormality determination apparatus 123 through the fog networks 31 and 32. Then, the abnormality determination apparatus 123 stores the thresholds Th41 and Th42 as the pattern of the determination information, while sequentially updating the thresholds (S50).

In parallel with the data analyses used for generating the thresholds Th41 and Th42 as the determination information, the analysis apparatuses 50 and 60 extract only a part of information from among the acquired data (S51). For example, the analysis apparatuses 50 and 60 extract not data of all the production objects but data of some production objects. The analysis apparatuses 50 and 60, for example, extract data of one production object from a same lot. The analysis apparatuses 50 and 60 transmit the extracted information to the higher-rank analysis apparatus 70 through the cloud network 40. The transmission, for example, may be performed once a week or once a month.

Then, the higher-rank analysis apparatus 70 acquires apart of the information of the data through the cloud network 40 (S52). In addition, as is necessary, the higher-rank analysis apparatus 70 acquires various kinds of control parameters from the analysis apparatuses 50 and 60. The data amount of the various kinds of control parameters is smaller than that of the detection information.

The higher-rank analysis apparatus 70 performs a higher-rank data analysis based on a part of the data and various kinds of control parameters acquired from the analysis apparatuses 50 and 60 (S53). The higher-rank data analysis is so-called data mining. The higher-rank analysis apparatus 70 performs the higher-rank data analysis by using the information of the production facilities 11 to 13 and the production facilities 21 to 23 installed in mutually-different areas. Accordingly, the higher-rank analysis apparatus 70 can perform the higher-rank data analysis using a large quantity of information.

The analysis apparatuses 50 and 60 can acquire a result of the higher-rank data analysis performed by the higher-rank analysis apparatus 70 through the cloud network 40. Accordingly, the analysis apparatuses 50 and 60 update the thresholds Th41 and Th42 as the pattern of the determination information generated by its own data analysis by referring to the result of the higher-rank data analysis (S49). Then, the analysis apparatuses 50 and 60 transmit the thresholds Th41 and Th42 as updated determination information to the abnormality determination apparatus 123 through the fog networks 31 and 32. In this way, the abnormality determination apparatus 123 stores the thresholds Th41 and Th42 as determination information acquired in consideration of the result of the higher-rank data analysis while sequentially updating the thresholds (S50).

<4. Effects of Embodiment>

In the first embodiment to the third embodiment, the abnormality analysis system 1 includes: a plurality of production facilities 11 to 13, which are production facilities producing production objects, each including one or a plurality of detectors 112*b*, 114*c*, 114*d*, 115*b*, 116, 117, and 118*c*; a fog network (corresponding to a first network) 31 that is connected to the plurality of production facilities 11 to 13 and is installed within a predetermined area in which fog computing is built; and an analysis apparatus 50 that is connected to the fog network 31, performs a data analysis based on the detection information acquired by the detectors 112*b*, 114*c*, 114*d*, 115*b*, 116, 117, and 118*c* acquired through the fog network 31, and generates determination information relating to an abnormality of each of the plurality of production facilities 11 to 13 or an abnormality of a production object based on a result of the data analysis. Each of the plurality of production facilities 11 to 13 determines an abnormality of each of the plurality of production facilities 11 to 13 or an abnormality of a production object based on the determination information generated by the analysis apparatus 50.

The detectors 112*b*, 114*c*, 114*d*, 115*b*, 116, 117, and 118*c* of the plurality of production facilities 11 to 13 and the analysis apparatus 50 are connected through the fog network 31 installed within a predetermined area in which fog computing is built. The fog computing is a system connected to a network of an area narrower than that of cloud computing. In other words, the fog network 31 building the fog computing is a network installed within a predetermined area narrower than an area in which cloud computing is built. For this reason, in data communication between the detectors 112*b*, 114*c*, 114*d*, 115*b*, 116, 117, and 118*c* and the analysis apparatus 50, an occurrence of communication congestion is suppressed. In addition, since the fog network 31 is built within a narrow predetermined area, a communication time between the production facilities 11 to 13 and the analysis apparatus 50 can be shortened. Accordingly, the analysis apparatus 50 can receive the detection information acquired by the detectors 112*b*, 114*c*, 114*d*, 115*b*, 116, 117, and 118*c* at a high speed.

Since the analysis apparatus 50 can early acquire the detection information acquired by the plurality of production facilities 11 to 13 and perform a data analysis, a result acquired by the analysis apparatus 50 can be early fed back to the production facilities 11 to 13. Since the result of the analysis can be fed back to the production facilities 11 to 13, an occurrence of an abnormality of the production object can be early suppressed in a reliable manner.

In the first embodiment, the analysis apparatus 50 acquires all the detection information acquired by the detectors 112*b*, 114*c*, 114*d*, 115*b*, 116, 117, and 118*c* through the fog network 31 and performs a data analysis based on all the detection information. Particularly, the plurality of detectors 112*b*, 114*c*, 114*d*, 115*b*, 116, 117, and 118*c* acquire detection information at mutually-different sampling periods, and the analysis apparatus 50 acquires all the detection information acquired by the plurality of detectors 112*b*, 114*c*, 114*d*, 115*b*, 116, 117, and 118*c* and performs a data analysis based on all the detection information. In the fog network 31, a problem of a communication delay does not occur even when data communication for a large quantity of data is performed. Thus, the analysis apparatus 50 is configured to acquire all the detection information acquired by the detectors 112*b*, 114*c*, 114*d*, 115*b*, 116, 117, and 118*c*. Accordingly, the analysis apparatus 50 can perform a data analysis with high precision in real time.

In the second embodiment and the third embodiment, the abnormality determination apparatus 123 generates post-processing data by performing a predetermined process for the detection information acquired by the detectors 112*b*, 114*c*, 114*d*, 115*b*, 116, 117, and 118*c* and performs an abnormality determination based on the determination information. Then, the analysis apparatuses 50 and 60 acquire the post-processing data through the fog network 31, perform data analyses based on the post-processing data, and update the determination information based on a result of the data analysis.

The abnormality determination apparatus 123 performs an abnormality determination, and the analysis apparatuses 50 and 60 update the determination information. Here, the analysis apparatuses 50 and 60 use the post-processing data acquired by performing a predetermined process for the detection information acquired by the detectors 112*b*, 114*c*, 114*d*, 115*b*, 116, 117, 118*c*. In other words, the analysis apparatuses 50 and 60 do not update the determination information based on all the detection information acquired by the detectors 112*b*, 114*c*, 114*d*, 115*b*, 116, 117, and 118*c*. Accordingly, when the determination information is updated, the analysis apparatuses 50 and 60 can perform the process at a higher speed than that of a case where all the detection information is used. As above, the abnormality analysis system 1 can reliably update the determination information while performing an abnormality determination.

Particularly, the data volume of the post-processing data for which the predetermined process has been performed by the abnormality determination apparatus 123 is configured to be smaller than that of the detection information before the processing. For this reason, the communication amount in the fog network 31 can be decreased, and the analysis apparatuses 50 and 60, for example, can shorten a time required for acquiring data corresponding to one day. As a result, the analysis apparatuses 50 and 60 can secure a time that is sufficient for performing the analysis.

In the second embodiment, the abnormality determination apparatus 123 performs an abnormality determination based on the generated post-processing data and the determination information, and the analysis apparatuses 50 and 60 update the determination information based on the post-processing data used for the determination by the abnormality determination apparatus 123. In other words, the post-processing data is shared with the abnormality determination apparatus 123 and the analysis apparatuses 50 and 60.

Particularly, in the second embodiment, the detector 112*b* is a vibration detecting sensor, and the predetermined process performed by the abnormality determination apparatus 123 is a frequency analysis for the detection information acquired by the detector 112*b*. Accordingly, the abnormality determination apparatus 123, instead of generating data that is dedicatedly used by the analysis apparatuses 50 and 60, only generates data used by the abnormality determination apparatus. Thus, since the abnormality determination apparatus 123 does not require a dedicated process, the abnormality determination apparatus 123 can perform its own process at a high speed, and an effect of decreasing the communication amount in the fog network 31 is acquired.

In the third embodiment, the predetermined process performed by the abnormality determination apparatus 123 is the process of extracting specified information from the detection information acquired by the detectors 115*b* and 117. Also in this case, the abnormality determination apparatus 123, instead of generating data dedicatedly used by the analysis apparatuses 50 and 60, only generates data used by the abnormality determination apparatus. Thus, since the abnormality determination apparatus 123 does not need a dedicated process, the own process of the abnormality determination apparatus 123 can be performed at a high speed, and an effect of decreasing the amount of communication in the fog network 31 is acquired.

In addition, in the second embodiment and the third embodiment, the analysis apparatuses 50 and 60 analyze the normal tendency pattern of the evaluation parameter with respect to the regulation parameter through a data analysis and update the pattern of the determination information for the evaluation parameter with respect to the regulation parameter based on the normal tendency pattern. Then, the abnormality determination apparatus 123 acquires an actual regulation parameter and an actual evaluation parameter and performs an abnormality determination based on the pattern of the determination information, the actual regulation parameter, and the actual evaluation parameter.

For example, in the second embodiment, as the first example, the regulation parameter is a period of time in one day, and the evaluation parameter is a parameter changing according to the period of time in one day. In addition, in the second embodiment, as the second example, the regulation parameter is a period of time in one year, and the evaluation parameter is a parameter changing according to the period of time in one year.

The state of each of constituent components of the production facilities 11 to 13 or the state of the production object, for example, changes according to an elapsed time after the startup of the production facilities 11 to 13, an environmental temperature, and the like. The environmental temperature changes according to a period of time in one day or a time period in one year. In addition, the elapsed time after the startup of the production facilities 11 to 13, in a case where the production facilities are started up once a day, changes according to a period of time in one day. Thus, by setting the regulation parameter and the evaluation parameter as described above, the states of the production facilities 11 to 13 and the state of the production object can be reliably evaluated.

Particularly, the detector 112*b* detects a vibration of the production facilities 11 to 13 or the production object, and the evaluation parameter is set as a peak value of a predetermined frequency band in the vibration. The amplitude of the vibration, for example, is a parameter changing according to an elapsed time after the startup of the production facilities 11 to 13, an environmental temperature, and the like. In other words, the peak value is a parameter changing according to an elapsed time after the startup of the production facilities 11 to 13, an environmental temperature, and the like. Thus, by setting the evaluation parameter as the peak value, the states of the production facilities 11 to 13 or the state of the production object can be reliably evaluated.

In the third embodiment, the regulation parameter is the environmental temperature, and the evaluation parameter is the parameter changing according to the environmental temperature. In this case, by setting the environmental temperature as the regulation parameter, the states of the production facilities 11 to 13 or the state of the production object can be evaluated by evaluating the parameter changing according to the environmental temperature.

In the second embodiment and the third embodiment, after the predetermined process is performed by the abnormality determination apparatus 123 a plurality of number of times, the analysis apparatuses 50 and 60 acquire results of the predetermined process corresponding to the plurality of number of times performed by the abnormality determination apparatus 123 altogether. In other words, the analysis apparatuses 50 and 60 do not acquire data from the abnormality determination apparatus 123 every time when the abnormality determination apparatus 123 acquires detection information acquired by the detectors 112*b*, 114*c*, 114*d*, 115*b*, 116, 117, and 118*c*.

Here, in the second embodiment and the third embodiment, the abnormality determination apparatus 123 performs the predetermined process for the detection information, and the analysis apparatuses 50 and 60 acquire post-processing data of which the data amount is decreased through the predetermined process. Accordingly, although the analysis apparatuses 50 and 60 acquire the results corresponding to the plurality of number of times altogether, the amount of communication in the fog network 31 is sufficiently small.

In the first embodiment to the third embodiment, a predetermined area in which the fog network 31 is built is inside a same building as a building in which one of the plurality of production facilities 11 to 13 is installed or inside a building neighboring to a building in which the production facilities 11 to 13 are installed. Accordingly, the production facilities 11 to 13 and the analysis apparatus 50 can be reliably configured using the fog network 31.

In the first embodiment to the third embodiment, since the analysis is performed at a place close to the production facilities 11 to 13, an operator can determine a value (determination information) used for determining whether a state is abnormal or normal while checking the state of the production object or the production facilities 11 to 13. In addition, when a sudden abnormality occurs in the production facilities 11 to 13 or the production object, the analysis is performed at a place close to the production facilities 11 to 13. Accordingly, in cooperation of the operator and the analysis apparatus 50, the analysis of data can be immediately performed, and a result thereof can be immediately reflected on the determination information for the target production facilities 11 to 13. In addition, according to the result of the analysis performed by the analysis apparatus 50, in a stage in which a determination of an abnormality is made, or a stage (a state that is not abnormal but is close to an abnormality) prior to the determination of an abnormality, the production facilities 11 to 13 or the analysis apparatus 50 can notify the operator of the abnormal state or automatically stop the operations of the production facilities 11 to 13.

In the first embodiment to the third embodiment, the analysis apparatus 50 includes the display unit 52 displaying a result of the data analysis and the input unit 53 receiving operator's input of the determination information. A setting of the determination information for the production facilities 11 to 13 can be manually made by the operator. The setting is not limited to the operator's manual setting, but an automatic setting can be made by the system.

In the first embodiment to the third embodiment, the abnormality analysis system 1 includes: other production facilities 21 to 23 that are not directly connected to the fog network 31 but include the other detectors 112b, 114c, 114d, 115b, 116, 117, and 118c; the cloud network 40 (corresponding to a second network) that is connected to the plurality of the production facilities 11 to 13 and the other production facilities 21 to 23 and builds cloud computing of an area wider than the predetermined area of the fog network 31; and the higher-rank analysis apparatus 70 that is connected to the cloud network 40 and performs a higher-rank data analysis based on the detection information acquired by the detectors 112b, 114c, 114d, 115b, 116, 117, and 118c and the detection information acquired by the other detectors 112b, 114c, 114d, 115b, 116, 117, and 118c through the cloud network 40.

The analysis apparatus 50 may be configured to determine and store determination information based on a result of the data analysis performed by the analysis apparatus 50 and a result of the higher-rank data analysis performed by the higher-rank analysis apparatus 70. Accordingly, by performing the higher-rank data analysis using information that is not acquired from the production facilities 11 to 13 and feeding back the result thereof to the production facilities 11 to 13, better determination information can be acquired.

In the first embodiment to the third embodiment, the analysis apparatus 50 acquires all the detection information acquired by the detectors 112b, 114c, 114d, 115b, 116, 117, and 118c and performs a data analysis. On the other hand, the higher-rank analysis apparatus 70 acquires a part of the detection information acquired by the detectors 112b, 114c, 114d, 115b, 116, 117, and 118c of the production facilities 11 to 13 and a part of the detection information of the other detectors 112b, 114c, 114d, 115b, 116, 117, and 118c of the other production facilities 21 to 23 and performs a higher-rank data analysis. Even in a case where a high-speed process is not required for the higher-rank analysis apparatus 70, in a case where all the detection information acquired by the detectors 112b, 114c, 114d, 115b, 116, 117, and 118c is transmitted to the higher-rank analysis apparatus 70 through the cloud network 40, there is concern that the other persons may be influenced by a communication delay of the cloud network 40. Thus, as described above, the amount of data communication in the cloud network 40 corresponds to a part of the detection information, and an influence of the communication delay of the cloud network 40 can be suppressed.

In the first embodiment to the third embodiment, each of the plurality of the production facilities 11 to 13 includes a grinder that grinds a production object, and the determination information, for example, is determination information relating to a grinding abnormality of the production object. Accordingly, in a system including the grinder, an occurrence of a grinding abnormality such as a grinding burn can be reliably suppressed.

In the first embodiment to the third embodiment, the determination information may be determination information relating to a component breakdown of any one of the plurality of the production facilities 11 to 13, a component life, or the necessity/non-necessity of maintenance of components. In such a case, the component breakdown of the production facilities 11 to 13 can be predicted, and component replacement can be prepared in advance. Until now, while component replacement is frequently performed based on the use period of a component, the life of each component is acquired with high accuracy, and then, the replacement of the component can be performed, whereby the use period of the component can be lengthened. In addition, maintenance of a component can be performed at an appropriate time period before the deterioration of the performance of the component. In this way, the use period of the component can be lengthened.

The invention claimed is:

1. An abnormality analysis system comprising:
a first plurality of production facilities each being a facility producing a production object and including at least one detector;
a first network that is connected to the first plurality of production facilities and is installed within a first predetermined area in which fog computing is built;
a first analysis apparatus that is connected to the first network, performs a data analysis based on detection information of the detectors acquired through the first network, and generates determination information relating to determining an abnormality of each of the first plurality of production facilities or determining an abnormality of the production object based on a result of the data analysis; and
a higher-rank analysis apparatus that is connected to a second network, acquires the detection information via the first network and the second network, performs a higher-rank data analysis based on the detection information, and transmits a result of the higher-rank data analysis to the first analysis apparatus, the second network installed within a second predetermined area different from the first predetermined area and building a cloud computing area wider than the first predetermined area and the second predetermined area, wherein
the first analysis apparatus generates the determination information based on the result of the data analysis and the result of the higher-rank data analysis, and
each of the first plurality of production facilities includes an abnormality determination apparatus that determines the abnormality of the each of the first plurality of production facilities or the abnormality of the production object based on the determination information generated by the first analysis apparatus.

2. The abnormality analysis system according to claim 1, wherein the first analysis apparatus acquires all the detection information of the detectors through the first network and performs the data analysis based on all the detection information.

3. The abnormality analysis system according to claim 2,
wherein each of the first plurality of production facilities includes a plurality of detectors,
wherein the plurality of the detectors acquire the detection information at mutually-different sampling periods, and
wherein the first analysis apparatus acquires all the detection information of the plurality of the detectors and performs the data analysis based on all the detection information.

4. The abnormality analysis system according to claim 1,
wherein the abnormality determination apparatus generates post-processing data by performing a predetermined process for the detection information of the detectors, and
wherein the first analysis apparatus acquires the post-processing data through the first network, performs the data analysis based on the post-processing data, and updates the determination information based on the result of the data analysis.

5. The abnormality analysis system according to claim 4,
wherein the abnormality determination apparatus performs the abnormality determination based on the generated post-processing data and the determination information,
wherein the first analysis apparatus updates the determination information based on the post-processing data used for the determination by the abnormality determination apparatus, and
wherein the post-processing data is shared with the abnormality determination apparatus and the first analysis apparatus.

6. The abnormality analysis system according to claim 5,
wherein the detectors are vibration detecting sensors, and
wherein the predetermined process is a frequency analysis for the detection information of the detectors.

7. The abnormality analysis system according to claim 5, wherein the predetermined process is a process of extracting specified information from the detection information of the detectors.

8. The abnormality analysis system according to claim 4,
wherein the first analysis apparatus analyzes a normal tendency pattern for an evaluation parameter with respect to a regulation parameter through the data analysis and updates a pattern of the determination information for the evaluation parameter with respect to the regulation parameter based on the normal tendency pattern, and
wherein the abnormality determination apparatus acquires the actual regulation parameter and the actual evaluation parameter and performs the abnormality determination based on the pattern of the determination information, the actual regulation parameter, and the actual evaluation parameter.

9. The abnormality analysis system according to claim 8,
wherein the regulation parameter is a period of time in one day, and
wherein the evaluation parameter is a parameter changing according to the period of time in one day.

10. The abnormality analysis system according to claim 8,
wherein the regulation parameter is a time period in one year, and
wherein the evaluation parameter is a parameter changing according to the time period in one year.

11. The abnormality analysis system according to claim 9,
wherein each of the detectors detects a vibration of the production facility or the production object, and
wherein the evaluation parameter is a peak value of a predetermined frequency band in the vibration.

12. The abnormality analysis system according to claim 8,
wherein the regulation parameter is an environmental temperature, and
wherein the evaluation parameter is a parameter changing according to the environmental temperature.

13. The abnormality analysis system according to claim 4,
wherein the first analysis apparatus, after the predetermined process of the abnormality determination apparatus is performed a plurality of a number of times, acquires results of the process performed the plurality of the number of times altogether.

14. The abnormality analysis system according to claim 1,
wherein the first predetermined area is inside a same building as a building in which any one of the first plurality of production facilities is installed or inside a building neighboring to the building in which the one first production facility is installed.

15. The abnormality analysis system according to claim 1,
wherein the first analysis apparatus includes a display unit that displays a result of the data analysis and an input unit that receives operator input of the determination information.

16. The abnormality analysis system according to claim 1, further comprising:
a second plurality of production facilities connected to the second network and including other detectors; and
a second analysis apparatus that performs a data analysis based on detection information of the other detectors acquired through the second network, and generates determination information relating to determining an abnormality of each of the second plurality of production facilities,
wherein the higher-rank analysis apparatus acquires the detection information of the other detectors and performs the higher-rank data analysis based the detection information of the other detectors.

17. The abnormality analysis system according to claim 16,
wherein the higher-rank analysis apparatus acquires only a part of the detection information that is a portion less than the whole of the detection information and only a part of the detection information of the other detectors that is a portion less than the whole of the detection information of the other detectors and performs the higher-rank data analysis based on the part of the detection information and the part of the detection information of the other detectors.

18. The abnormality analysis system according to claim 1,
wherein each of the first plurality of production facilities includes a grinder grinding the production object, and
wherein the determination information is determination information relating to determining a grinding abnormality of the production object.

19. The abnormality analysis system according to claim 1,
wherein the determination information is determination information relating to a component breakdown of any one of the first plurality of production facilities, a component life, or necessity/non-necessity of maintenance of a component.

20. The abnormality analysis system according to claim 1,
wherein the higher-rank analysis apparatus acquires the detection information at a frequency less than a frequency with which the first analysis apparatus acquires the detection information.

21. An abnormality analysis system comprising:
a first plurality of production facilities each being a facility producing a production object and including at least one detector;
a first network that is connected to the first plurality of production facilities and is installed within a first predetermined area in which fog computing is built; and
a first analysis apparatus that is connected to the first network, performs a data analysis based on detection information of the detectors acquired through the first network, and generates determination information relating to determining an abnormality of each of the first plurality of production facilities or determining an abnormality of the production object based on a result of the data analysis, wherein
the first analysis apparatus comprises:
   a display unit that displays the determination information as a result of the data analysis; and
   an input unit that receives operator input for an operator to change the determination information,
the first analysis apparatus is at a place close to the first plurality of production facilities so that the operator can perform the input to change the determination information by using the input unit based on the determination information displayed on the display unit, and
each of the first plurality of production facilities includes an abnormality determination apparatus that determines the abnormality of the each of the first plurality of production facilities or the abnormality of the production object based on the determination information generated by the first analysis apparatus.

\* \* \* \* \*